(No Model.)
A. J. GRAYDON.
ELECTRIC CIGAR LIGHTER.
No. 514,651.   Patented Feb. 13, 1894.
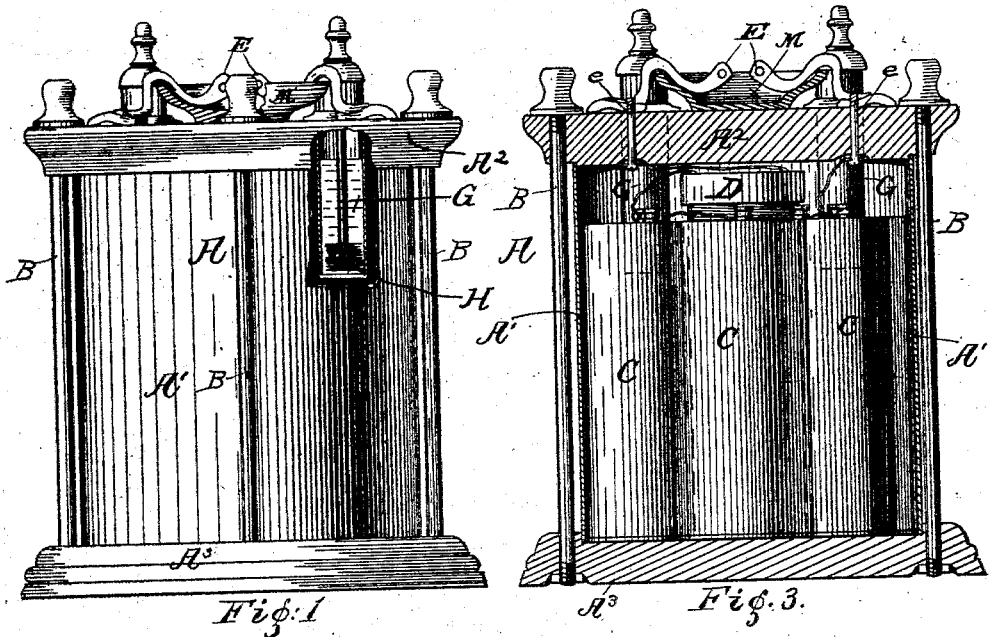
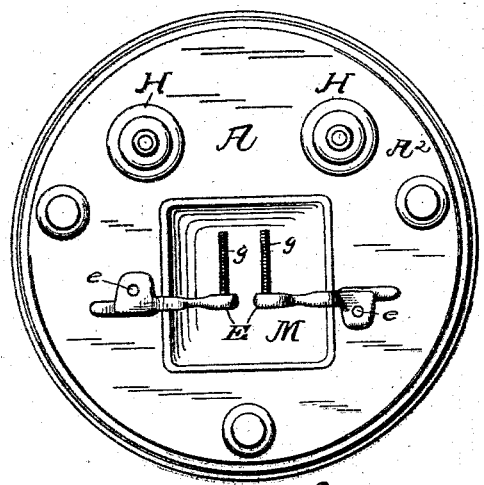
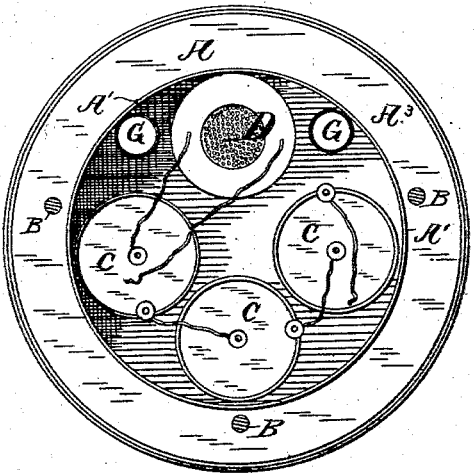
Witnesses
W L Bushong
Lou Hope
Inventor
Alexander J Graydon
By Joseph A Minturn
Atty.

UNITED STATES PATENT OFFICE.

ALEXANDER J. GRAYDON, OF INDIANAPOLIS, INDIANA.

ELECTRIC CIGAR-LIGHTER.

SPECIFICATION forming part of Letters Patent No. 514,651, dated February 13, 1894.

Application filed March 6, 1893. Serial No. 464,877. (No model.)

*To all whom it may concern:*

Be it known that I, ALEXANDER J. GRAYDON, a citizen of the United States, residing at Indianapolis, in the county of Marion and State of Indiana, have invented certain new and useful Improvements in Electric Cigar-Lighters; and I do hereby declare the following to be a full, clear, and exact description of the invention, such as will enable others skilled in the art to which it appertains to make and use the same.

This invention relates to improvements in electric cigar lighters, the object first being to provide an electric spark by which alcohol on a metallic brush may be ignited into a flame, second to provide a compactly arranged battery so as to occupy as little space as possible, and having sealed cells that will render the device thoroughly portable and enable it to be put together at the factory and shipped ready for immediate use without filling or other special attention, third, to provide a neat, serviceable and compact case to receive the battery and to contain all of the operative parts of my device; that will be cheap to manufacture and owing to its portable nature may be placed wherever desired and moved with ease and perfect freedom.

I accomplish the objects of this invention by the mechanism illustrated in the accompanying drawings, in which—

Figure 1 is a view in rear elevation of my invention as it appears when ready for use. In this view a portion of the case is broken away to show one of the brushes and the alcohol receptacle in which the brush is placed when not in use. The figure also shows the drip pan on top broken away to reveal the terminals of the wires. Fig. 2 is a plan view of same. Fig. 3 is a view in vertical section of the case and shows the position and arrangement of the cells and the connection of the wires with the terminals on top of the case. Fig. 4 is a view in horizontal section of my case and shows the arrangement of the battery therein.

Similar letters refer to like parts throughout the several views of the drawings.

A is the case within which the battery will be inclosed so as to be completely hid from external view. The sides A' of this case are preferably of metal and cylindrical. The top $A^2$ and the bottom $A^3$ are circular and may be either of metal or wood, and will be provided with a suitable indentation to receive the ends of the sides A' in order to make a tight joint between the sides and ends.

B are bolts connecting the top and bottom pieces and have threaded ends upon which nuts with suitably threaded openings are inserted and by tightening up the nuts the top and bottom pieces of the case will be tightly impinged against and secured to the sides A'. The bolts B may be arranged on the outside of the case as shown in the drawings or they may be located on the inside of the case where they will be out of sight.

C are the cells of an electric battery and may be one or more in number properly connected. They will preferably be of the class having hermetically sealed piles and known commercially as dry battery cells. The dry battery is preferable on account of its compactness, less liability to accident in shipment and as requiring less attention at the hands of inexperienced users.

D is an induction coil of usual construction and connected with the primary circuit in the usual manner to increase the efficiency of the battery.

E are the positive and negative terminals and are fastened by means of the screws $e$ to the outside of the top of the case. The screws $e$ are projected through the top of the case and the battery wires are connected to them on the under side, in their proper order, so that the screws $e$ serve the double purpose of fastening the terminals to the top and of continuing the electric circuit through the top, from the wires of the battery to the terminals.

One or more reservoirs G to contain a supply of alcohol, are suspended within the case, from the top $A^2$.

H are metallic wire brushes which, when not in use for lighting cigars will be immersed and left standing in the alcohol within the reservoirs G so as to be always thoroughly saturated for immediate use. The alcohol on these brushes will be ignited by touching the wires of the brush to the terminals E so as to create a spark by the passage of the electric current. This sparking may be facilitated by drawing the brush back and forth over the roughened surface of the fingers $g$ which are projected laterally from the ends of the terminals as clearly shown in Fig. 2. In the construction shown, these arms are simply threaded screws suitably attached to the terminals.

M is a drip pan to catch the surplus of alcohol that may drop from the brush.

The brushes H are provided with suitable stems and hand-knobs, which latter may be ornamented to any desired degree.

I claim—

The combination, with the one-piece side casing $A'$, the top $A^2$ and bottom $A^3$ both indented to receive said casing, and bolts B passing through said top and bottom and means for tightening said bolts for adjustably connecting the aforesaid elements to form a casing, a series of batteries and an induction coil in the circuit, in the casing, to generate an electric current, of terminals E supported on the top of said casing and having lateral extensions $g$, a drip pan underneath said extensions, and bolts or pins $e$ passing through the top $A^2$, their heads being within the casing and the conductors being looped about said pins above said heads, and the other ends being screw-threaded and screwed into the terminals E, whereby on being tightly screwed therein, the heads of the pins serve as contact clamps for the conductors, the screw-threaded ends support the terminals, and the bolts themselves serve as conductors through the top $A^2$ of the casing, substantially as described.

In testimony whereof I affix my signature in presence of two witnesses.

ALEXANDER J. GRAYDON.

Witnesses:
JOSEPH A. MINTURN,
WM. HOFER.